United States Patent
Ben-Ari et al.

(10) Patent No.: US 12,414,106 B2
(45) Date of Patent: Sep. 9, 2025

(54) SIDELINK PSCCH TIMING ESTIMATION

(71) Applicant: QUALCOMM Incorporated, San Diego, CA (US)

(72) Inventors: Moshe Ben-Ari, Rehovot (IL); Gideon Shlomo Kutz, Ramat Hasharon (IL); Peer Berger, Hod Hasharon (IL); Yehuda Shabtay Barel, Kfar Saba (IL); Tal Oved, Modiin (IL)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 18/339,208

(22) Filed: Jun. 21, 2023

(65) Prior Publication Data

US 2024/0430882 A1  Dec. 26, 2024

(51) Int. Cl.
*H04W 72/1263* (2023.01)
*H04L 1/00* (2006.01)
*H04L 5/00* (2006.01)
*H04L 27/26* (2006.01)

(52) U.S. Cl.
CPC ....... *H04W 72/1263* (2013.01); *H04L 1/0061* (2013.01); *H04L 5/0051* (2013.01); *H04L 27/2605* (2013.01)

(58) Field of Classification Search
None
See application file for complete search history.

(56) References Cited

U.S. PATENT DOCUMENTS

| | | | | |
|---|---|---|---|---|
| 11,082,996 B2 * | 8/2021 | Li | .................. | H04W 72/20 |
| 11,140,528 B2 * | 10/2021 | Lee | .................. | H04L 27/2605 |
| 11,895,622 B2 * | 2/2024 | Yasukawa | ............... | H04J 13/18 |
| 2009/0129492 A1 * | 5/2009 | Hamaguchi | ....... | H04L 27/26362 |
| | | | | 455/39 |
| 2015/0270939 A1 * | 9/2015 | Ro | ...................... | H04L 27/2613 |
| | | | | 370/329 |
| 2015/0305012 A1 * | 10/2015 | Yi | ....................... | H04L 5/0055 |
| | | | | 370/329 |
| 2019/0173703 A1 * | 6/2019 | Gao | .................... | H04L 27/2602 |
| 2019/0222447 A1 * | 7/2019 | Vos | .................... | H04L 27/2636 |
| 2020/0351857 A1 * | 11/2020 | Bharadwaj | ........... | H04L 5/0051 |

(Continued)

FOREIGN PATENT DOCUMENTS

WO  2019215260 A1  11/2019

OTHER PUBLICATIONS

Intel Corporation, Proposal to align DMRS cyclic shift for PSCCH and PSSCH (Correction to V2V Cr—36.211), Oct. 10-14, 2016, 3GPP TSG RAN WG1 Meeting #86bis, R1-1609453, All Pages. (Year: 2016).*

(Continued)

*Primary Examiner* — Otis L Thompson, Jr.
(74) *Attorney, Agent, or Firm* — Procopio, Cory, Hargreaves & Savitch LLP

(57) ABSTRACT

Apparatus, methods, and computer program products for wireless communication are provided. An example method may include establishing, with a second UE, a sidelink connection. The example method may further include communicating, with the second UE, a physical sidelink control channel (PSCCH) transmission carrying a PSCCH payload and a set of demodulation reference signal (DM RS) pilots, the PSCCH payload and the set of DM RS pilots being modulated based on a same cyclic shift (CS).

22 Claims, 12 Drawing Sheets

(56) References Cited

U.S. PATENT DOCUMENTS

2021/0289486 A1     9/2021  Chiu et al.
2021/0344541 A1*   11/2021  Shellhammer ...... H04L 27/2613
2022/0377566 A1*   11/2022  Shimezawa ....... H04W 52/0225

OTHER PUBLICATIONS

International Search Report and Written Opinion—PCT/US2024/033095—ISA/EPO—Oct. 24, 2024—12 pages.

* cited by examiner

SIDELINK PSCCH TIMING ESTIMATION

TECHNICAL FIELD

The present disclosure relates generally to communication systems, and more particularly, to wireless communication systems with timing estimation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices, such as sidelink communication. There exists a need for further improvements in wireless communication involving sidelink. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include at least one memory and at least one processor coupled to the at least one memory. Based at least in part on stored information that is stored in the at least one memory, the at least one processor is configured to cause the apparatus to establish, with a second UE, a sidelink connection. Based at least in part on stored information that is stored in the at least one memory, the at least one processor is configured to cause the apparatus to communicate, with the second UE, a physical sidelink control channel (PSCCH) transmission carrying a PSCCH payload and a set of demodulation reference signal (DM RS) pilots, the PSCCH payload and the set of DM RS pilots being modulated based on a same cyclic shift (CS).

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
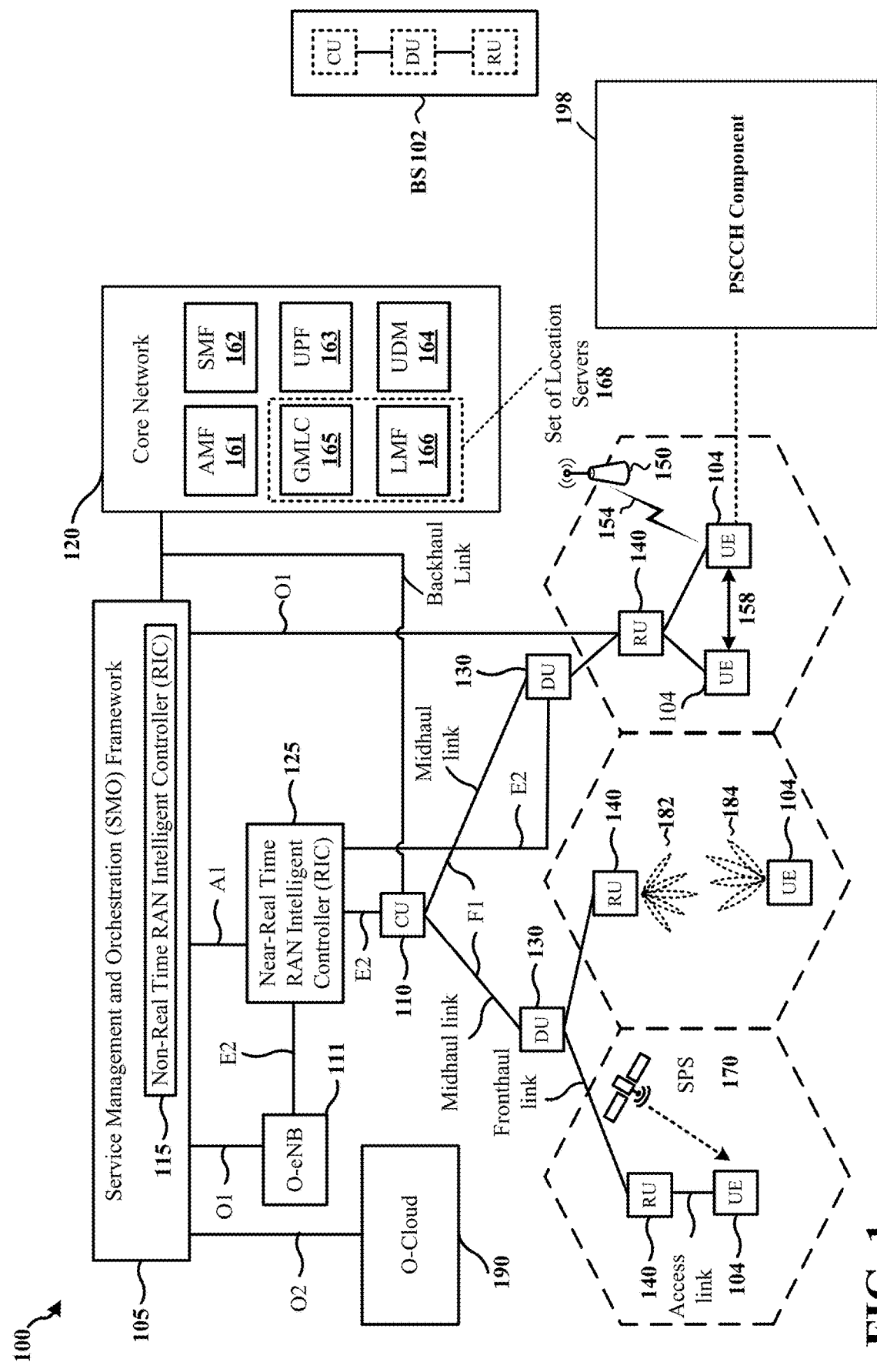
FIG. 1 is a diagram illustrating an example of a wireless communications system and an access network, in accordance with various aspects of the present disclosure.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Some wireless communication signals may include a cyclic shift. As an example, a physical sidelink control channel (PSCCH) may be transmitted by different UEs that transmit on a same time and frequency resource. Each of the PSCCH transmissions may include a DM RS pilot with a CS (e.g., a randomly selected cyclic shift or cyclic timing offset), which helps to provide orthogonality between the pilots transmitted by different UEs. The different CS may help a receiver to estimate the different channels and to differentiate between the PSCCH from different UEs. At a receiver, reception of communication from transmitting UEs outside a certain range, or distance, in the physical world may have an ambiguous timing offset (TO), and the receiver may not be able to distinguish between TO and CS. As a result, the demodulation at the receiver may be based on several CS hypothesis to try to correctly demodulate the signal based on one of the several CS hypothesis. Such hypothesis may be based on full flow demodulation including decoding and checking transport block (TB) and cyclic redundancy checksum (CRC) or by an early termination method, such as observations of quadrature amplitude modulation (QAM) symbols or log likelihood ratios (LLRs) to determine if a signal exists based on the hypothesis. Regardless of the processing used for the several CS hypothesis, processing additional hypothesis may use additional processing power and memory, which might, in practical receivers, consume more power, introduce extra latency, and limit the total amount of TBs that may be decoded. Aspects provided herein may provide the PSCCH such that reception of the PSCCH would not have an ambiguous TO while still using multiple CSs, causing the receiver to process the PSCCH more efficiently with potentially less latency. For example, a transmitting UE may use a PSCCH waveform in which the PSCCH payload (e.g., data) is modulated with the same CS as the DM RS pilot for the PSCCH. The modulation of the PSCCH payload with the same CS as the DM RS provides a transparent CS, and the receive can perform channel estimation for the PSCCH data without removing the CS from the DM RS. The receiver may remove an offset, e.g., that may be based on TO and/or CS, without processing for various CS hypotheses. Thus, the aspects presented herein help to decrease processing load and latency for wireless communication and help to decrease power consumption at the receiver.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer. While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other directly using device-to-device (D2D) communication link 158. The D2D communication link 158 may use the DL/UL wireless wide area network (WWAN) spectrum, in some aspects. The D2D communication link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), or a physical sidelink feedback channel (PSFCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR. Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications (e.g., including cellular V2X (CV2X)). Sidelink communication may be based on V2X or other D2D communication, such as Proximity Services (ProSc), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2, in some aspects. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like.

When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a PSCCH component 198. In some aspects, the PSCCH component 198 may be configured to establish, with a second UE, a sidelink connection. In some aspects, the PSCCH component 198 may be further configured to communicate, with the second UE, a PSCCH transmission carrying a PSCCH payload and a set of DM RS pilots, the PSCCH payload and the set of DM RS pilots being modulated based on a same CS.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2:
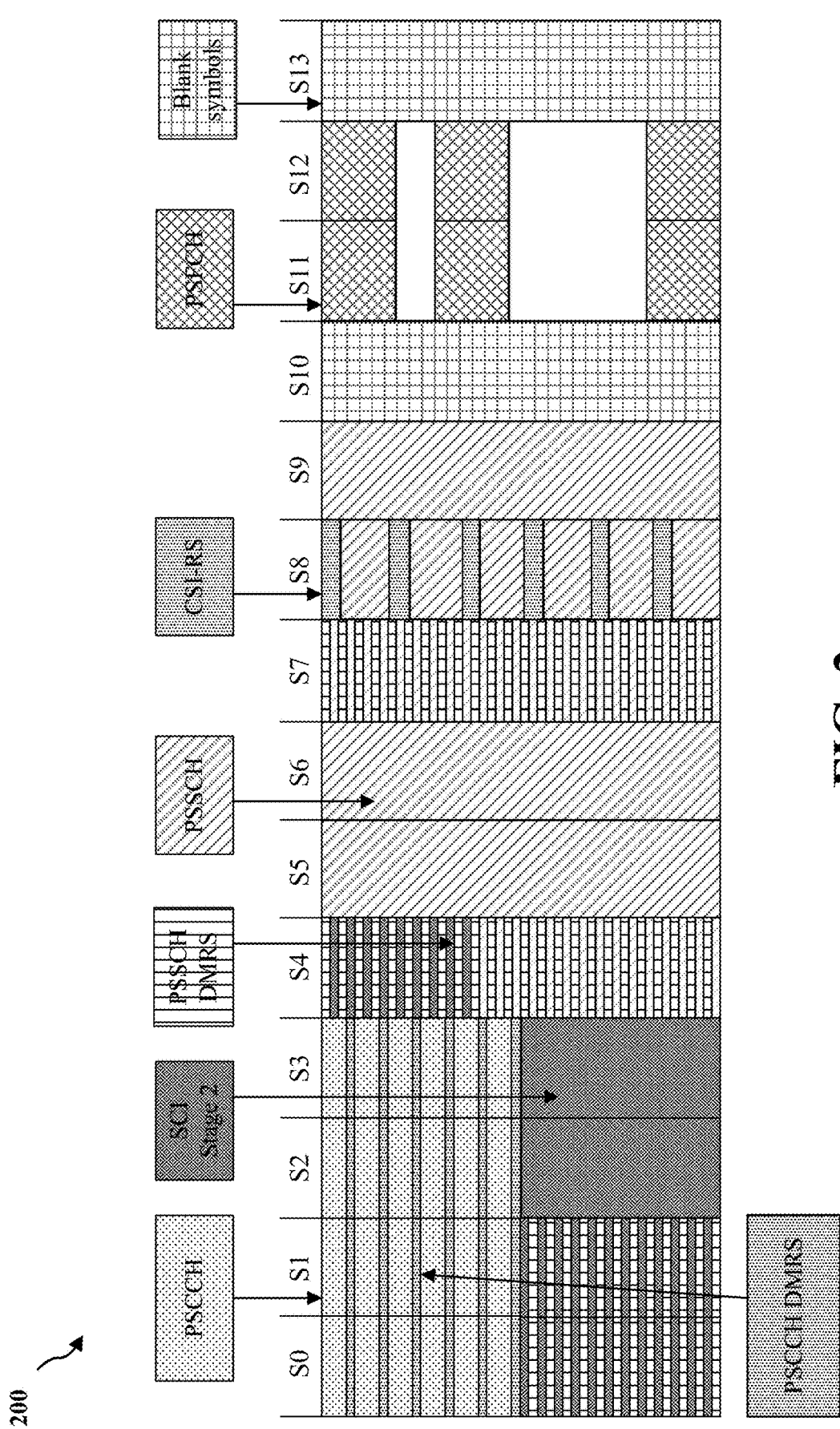
FIG. 2 illustrates example aspects of a sidelink (SL) slot structure.

FIG. 2 includes diagram 200 illustrating example aspects of slot structures that may be used for sidelink communication (e.g., between UEs 104, a RSU, or the like). The slot structure may be within, or may use aspects of, a 5G/NR frame structure in some examples. As an example, NR CV2X may be based on an NR frame structure. In other examples, the slot structure may be within an LTE frame structure. As an example, LTE based CV2X may use an LTE frame structure in some aspects. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates an example sidelink transmission. A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The physical sidelink shared channel (PSSCH) occupies at least one subchannel. In some aspects, the PSCCH may include a first portion of sidelink control information (SCI) that may be referred to as SCI-1, and the PSSCH may include a second portion of SCI that may be referred to as SCI-2. The SCI may indicate information for a receiver to receive a data transmission in PSSCH. In some aspects, the SCI may indicate the resources on which the PSSCH will be transmitted. In such aspects, the SCI may be referred to as including a resource reservation.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DM RS). There may be a 1:4 ratio between PSCCH and DM RS associated with the PSCCH. There may be a 1:2 ratio between PSSCH and DM RS associated with the PSSCH. At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DM RS. SCI, feedback, gap symbols, and/or LBT symbols may be different than the example illustrated in FIG. 2. Multiple slots may be aggregated together in some aspects.

Figure 3:
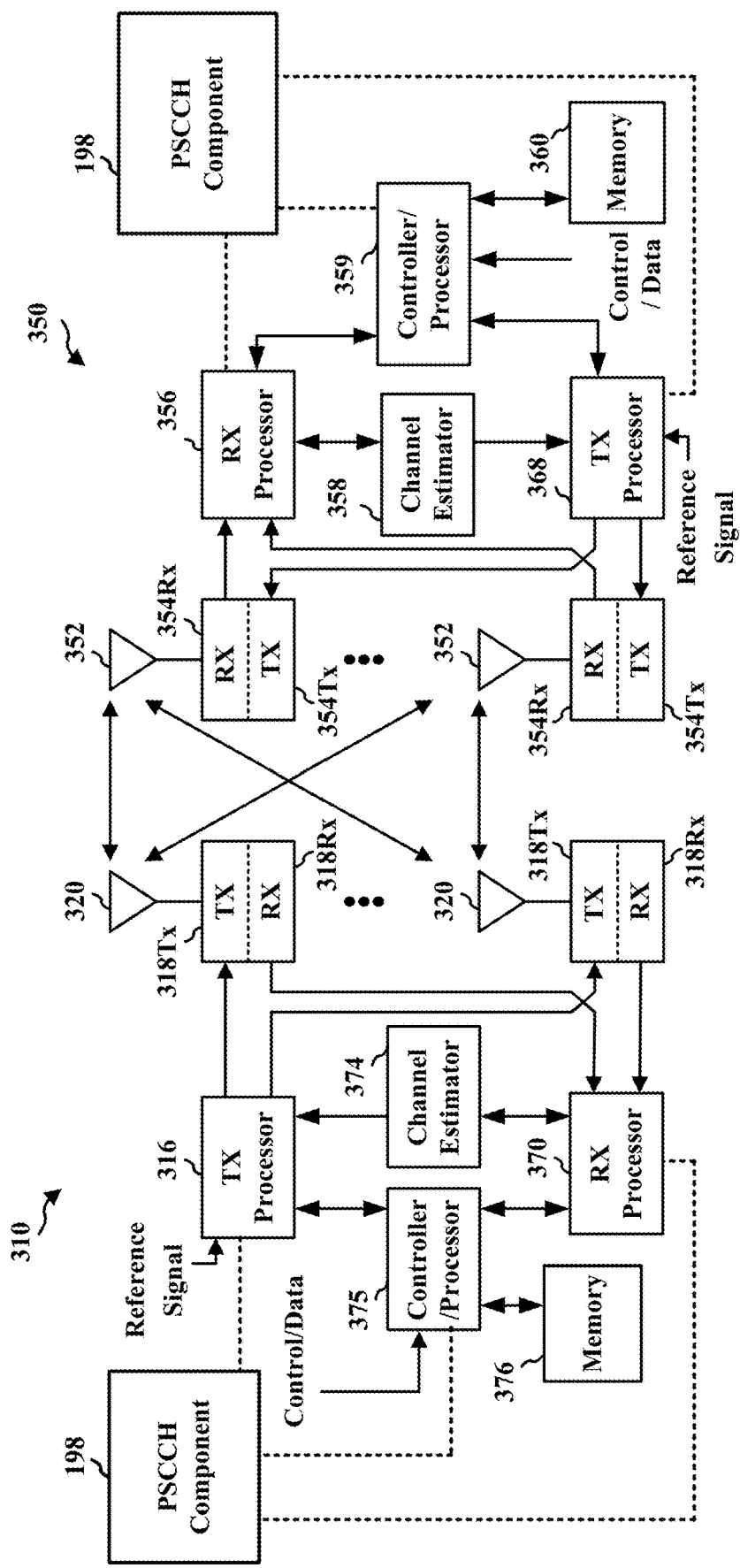
FIG. 3 is a diagram illustrating an example of a first device and second device in an access network, in accordance with various aspects of the present disclosure.

FIG. 3 is a block diagram of a first wireless communication device 310 in communication with a second wireless communication device 350 based on sidelink. In some examples, the devices 310 and 350 may communicate based on V2X or other D2D/ProSe communication. The communication may be based on sidelink using a PC5 interface. The devices 310 and the 350 may include a UE, an RSU, a base station, etc. Packets may be provided to a controller/processor 375 that implements layer 3 and layer 2 functionality. Layer 3 functionality may include a radio resource control (RRC) layer, and layer 2 functionality may include a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318Tx. Each transmitter 318Tx may modulate an RF carrier with a respective spatial stream for transmission.

At the device 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The transmission is processed at the device 310 in a manner similar to that described in connection with the receiver function at the device 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the PSCCH component 198 of FIG. 1.

Similarly, at least one of the TX processor 316, the RX processor 370, and the controller/processor 375 may be configured to perform aspects in connection with the PSCCH component 198 of FIG. 1.

Figure 4:
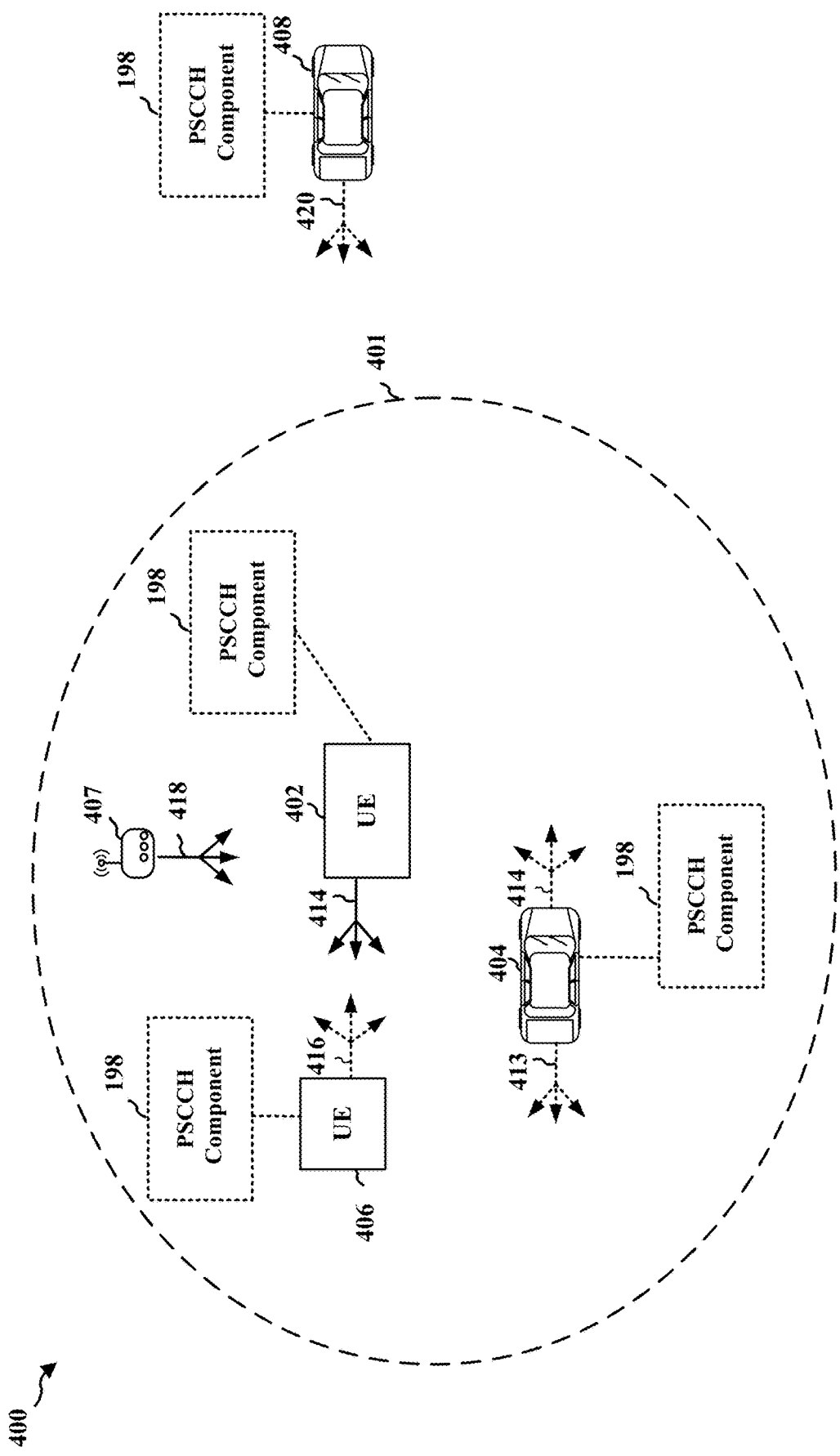
FIG. 4 is a diagram illustrating example aspects of sidelink communication between devices, in accordance with various aspects of the present disclosure.

FIG. 4 illustrates an example 400 of sidelink communication between devices. The communication may be based on a slot structure including aspects described in connection with FIG. 2. For example, the UE 402 may transmit a sidelink transmission 414, e.g., including a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 416, 420. The sidelink transmissions 413, 414, 416, 420 may be unicast, broadcast or multicast to nearby devices. For example, UE 404 may transmit transmissions 413 intended for receipt by other UEs within a range 401 of UE 404, and UE 406 may transmit transmission 416.

Additionally/alternatively, RSU 407 may receive communication from and/or transmit transmission 418 to UEs 402, 404, 406, 408. One or more of the UEs 402, 404, 406, 408 or the RSU 407 may include a SL component 198 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 may determine resources for sidelink communication and may allocate resources to different UEs 104 to use for sidelink transmissions. In this first mode, a UE receives the allocation of sidelink resources from the base station 102. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Cellular V2X (CV2X) is a unified connectivity platform for transferring safety messages between UEs in the form of cars and possibly other RSUs. The safety messages may be used for collision avoidance, traffic control, or the like. To support such applications, communications between these UEs in the form of cars and RSUs may be reliable over meaningful distances that may be high range. For higher range communications, the performance of such application may be better. Reception of the safety messages may involve demodulation and decoding of PSCCH and PSSCH. The PSSCH may be carrying the transmitted data and the PSCCH may be carrying information for PSSCH decoding. To decode the data carried in PSSCH, the PSCCH may be decoded first. CV2X PSCCH may be more robust than the PSSCH and there may be multiple users transmitting on the same time/frequency resource. In some wireless communication systems, to enable receivers to differentiate between multiple users transmitting on the same time/frequency resource, each DM RS pilots of the PSCCH may include a randomly selected cyclic shift (CS), which generates orthogonality between the pilots transmitted by the different UEs, hence enabling receives to estimate the respective channels, e.g., to demodulate the received PSCCH transmissions. In some aspects, DM RS reference symbols may be referred to as DM RS pilot symbols which may be inserted in an OFDM time-frequency grid to allow for channel estimation. DM RS pilot may be associated with a DM RS pilot pattern to enable channel estimation of different users or spatially multiplexed layers of the same user. Because the DM RS pilot may be transmitted with CS, the CS is used for demodulation of the PSCCH payload. To perform channel estimation, the CS may be removed from the channel estimation of the DM RS pilots, as the CS is not part of the physical channel for the PSCCH payload. At some receivers, the physical TO and CS may be detected by observing the signal location in the time domain and deciding which CS region the signal is located on. This is possible under the assumption that the physical timing offset may be small enough such that it may not cause the signal to be detected outside its CS borders as defined by the receiver. In mathematical formulation |TO−T_offset|<=D where TO is the physical TO. T_offset is defined by the receiver and decides the range of timing offsets to detect and D half the timing interval for a CS region which may be 1/30 KHz/4/3 so D=1/30 KHz/4/3/2=1.39 μs as an example. The physical TO (which may be otherwise referred to as "actual TO" and refers to the TO experienced at a receiver for a particular transmission) may be the result of synchronization differences between Tx device and Rx device or the result of propagation delay.

In some wireless communication systems, there may be multiple different CSs to choose from. As an example, there may be four CSs that can be selected by a transmitter. In an example with four CSs, the four different CSs may divide the symbol to 4 equal length CS intervals of 1/SCS/4=~ 16.7 microseconds (μs) for an SCS of 15 KHz. In some wireless communication systems, there may be three different CSs that divide the symbol into intervals of 1/SCS/3=11.1 us an SCS of 30 KHz. The PSCCH pilots may also be spaced based on 1:4 REs, which makes the overall time interval seen by the pilots to be ¼ symbol, and the practical interval per CS in one example may be 1/SCS/3/4=~ 2.78 μs (the 1:4 pilots may be causing four time domain duplications of the signal, which may be ambiguous to begin with, thus it may be enough to look at one such duplication). The duration of the CS range may drive the unambiguous TO range. In some aspects, unambiguous TO may refer to a TO that may be small enough in absolute to cause the signal to be detected within its own CS region. Ambiguous TO may refer to a TO that may be large enough to cause the signal to be detected outside its own CS region. As discussed herein, the mathematical condition for unambiguous TO may be |TO−T_offset|<=D where D is half the duration of the CS time interval D=1/30 KHz/4/3/2=1.39 us and T_offset is a parameter defined by the receiver and determines detectable timing offset range.

For example, a CS interval of 2.78 μs, assuming the receiver may detect negative and positive timing offsets symmetrically, T_offset=0, Ambiguous TO is defined as |TO|>1.39 μs. Such a TO range is small and may correspond to +/−400 meters. Therefore, at a receiver, reception of communication of UEs in the form of cars outside the range of +/−400 meters may have an ambiguous TO, and the receiver may not be able to distinguish between TO and CS timing offset. As a result, the demodulation at the receiver may be based on several CS hypothesis to try to correctly demodulate the signal based on one of the several CS hypothesis. Such hypothesis may be based on full flow demodulation including decoding and checking transport block (TB) and cyclic redundancy checksum (CRC) or by an early termination method, such as observations of quadrature amplitude modulation (QAM) symbols or log likelihood ratios (LLRs) to determine if a signal exists based on the hypothesis. Regardless of the processing used for the several CS hypothesis, processing additional hypothesis may use additional processing power and memory, which might, in practical receivers, consume more power, introduce extra latency, and reduce the total amount of TBs that may be decoded.

Figure 5:
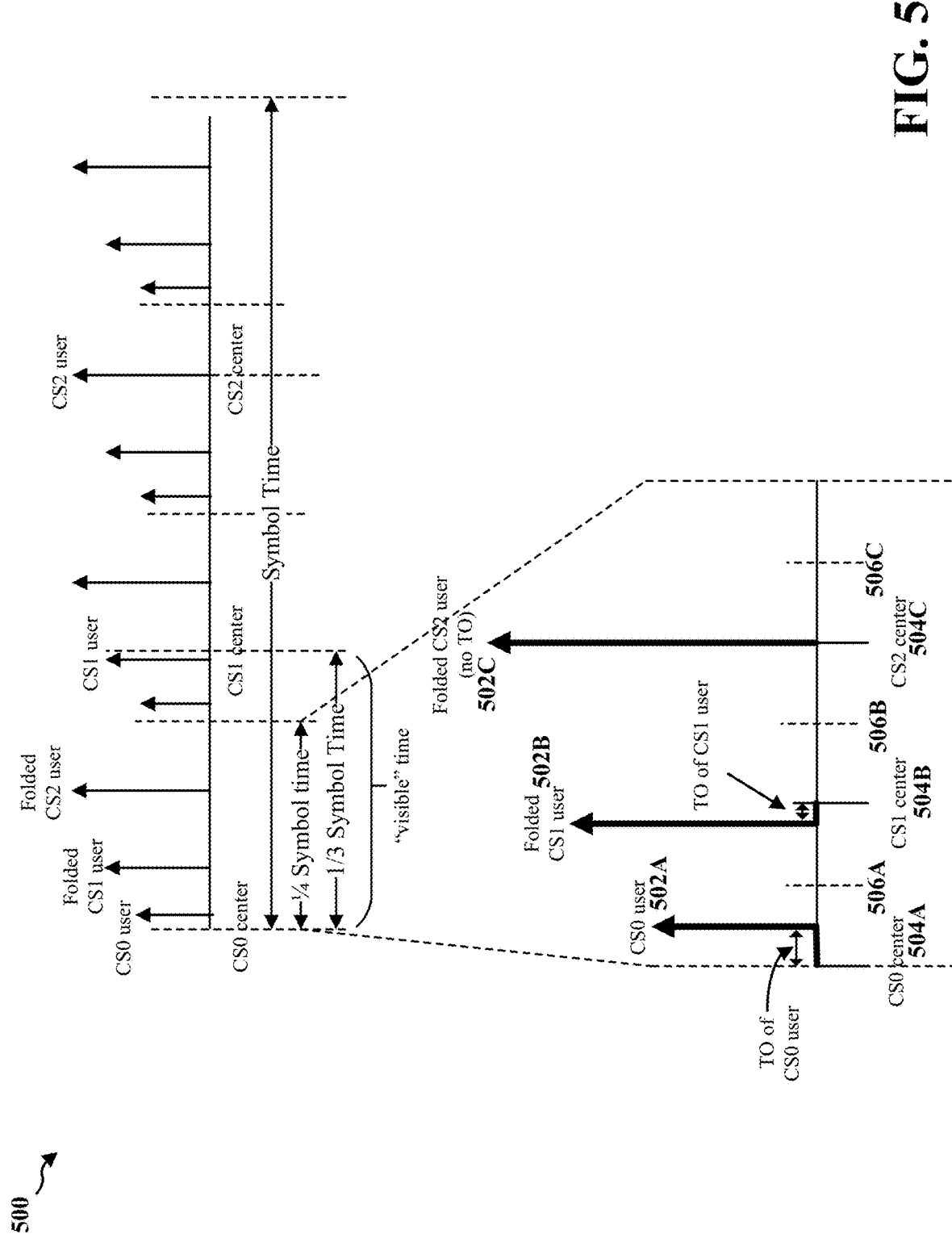
FIG. 5 is a diagram illustrating example timing offset (TO) associated with three different UEs where each of the three TOs is unambiguous, in accordance with various aspects of the present disclosure.

FIG. 5 is a diagram 500 illustrating example TO associated with three different UEs (which may also be referred to as "users") where each of the three TOs is unambiguous, in accordance with various aspects of the present disclosure. As illustrated in FIG. 5, there may be three different UEs each associated with a respective CS. All of the respective CSs associated with the three different UEs may be within an unambiguous TO range. As illustrated in FIG. 5, after factoring in the TO, a communication 502A associated with a first CS (CS0) user may be within a unambiguous range from the CS0 center 504A (based on being inside the boundary 506A from the CS0 center 504A). After factoring in the TO, a communication 502B associated with a second CS (CS1) user may be within a unambiguous range from the CS1 center 504B (based on being inside the boundary 506A and the boundary 506B from the CS1 center 504B). A communication 502C associated with a second CS (CS1) user may be within a unambiguous range from the CS2 center 504C (based on being inside the boundary 506B and the boundary 506C from the CS2 center 504C).

Figure 6:
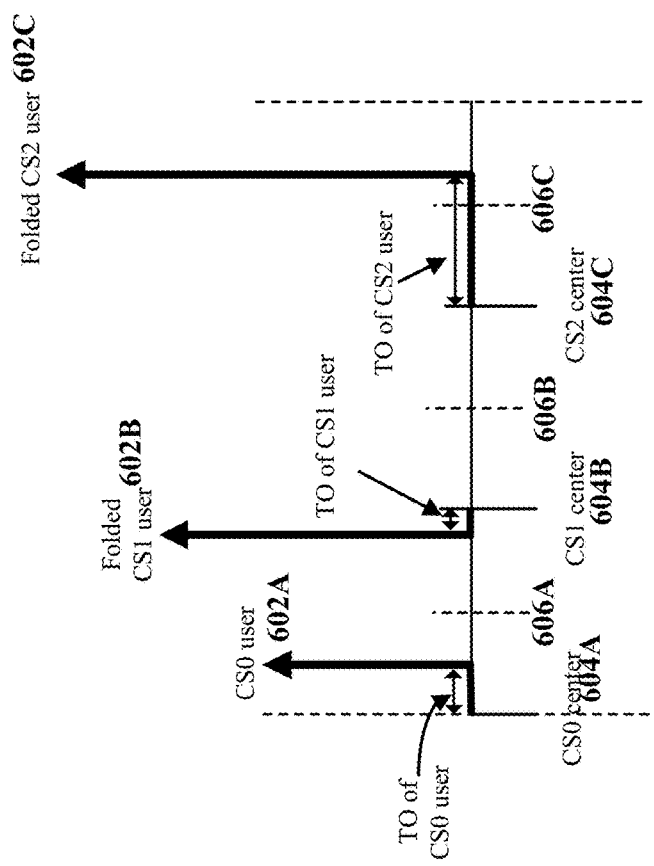
FIG. 6 is a diagram illustrating example TOs associated with three different UE where two of the three TOs are unambiguous and one of the three TOs is ambiguous, in accordance with various aspects of the present disclosure.

FIG. 6 is a diagram 600 illustrating example TOs associated with three different UE where two of the three TOs are unambiguous and one of the three TOs is ambiguous, in accordance with various aspects of the present disclosure. As illustrated in FIG. 6, there may be three different UEs each associated with a respective CS. Two of the three TOs are unambiguous and one of the three TOs is ambiguous. As illustrated in FIG. 6, after factoring in the TO, a communication 602A associated with a first CS (CS0) user may be within a unambiguous range from the CS0 center 604A (based on being inside the boundary 606A from the CS0 center 604A). After factoring in the TO, a communication 602B associated with a second CS (CS1) user may be within a unambiguous range from the CS1 center 604B (based on being inside the boundary 606A and the boundary 606B from the CS1 center 604B). After factoring in the TO, a communication 602C associated with a second CS (CS1) user may be within an ambiguous range from the CS2 center 604C (based on being outside the boundary 606B and the boundary 606C from the CS2 center 604C).

Figure 7:
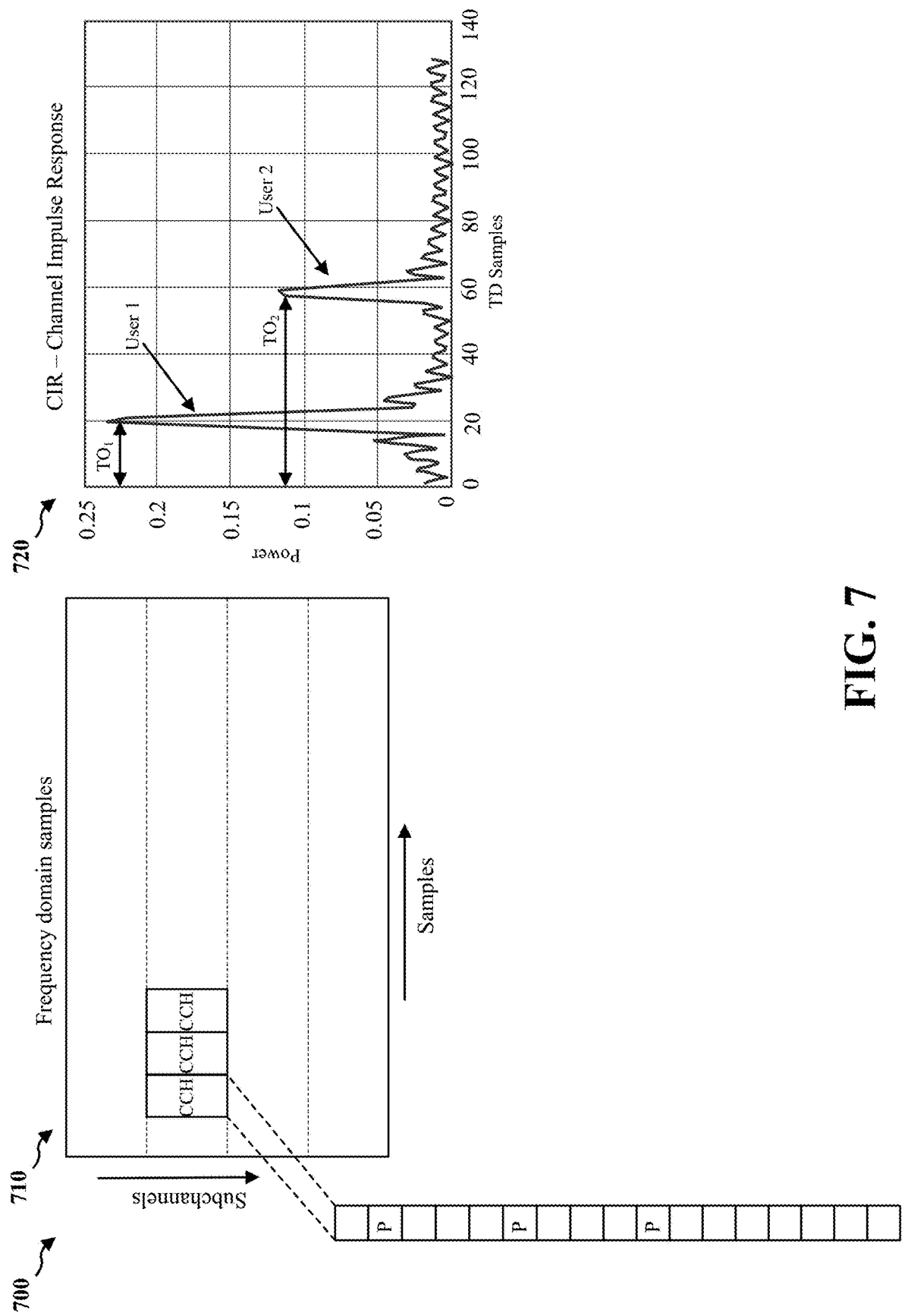
FIG. 7 is a diagram illustrating example frequency domain samples and channel impulse response, in accordance with various aspects of the present disclosure.

FIG. 7 is a diagram 700 illustrating example frequency domain samples and channel impulse response, in accordance with various aspects of the present disclosure. As illustrated in example frequency domain samples 710, there may be DM RS pilots in a PSCCH waveform. As illustrated in example channel impulse response 720, there may be different TOs associated with different users.

Figure 8:
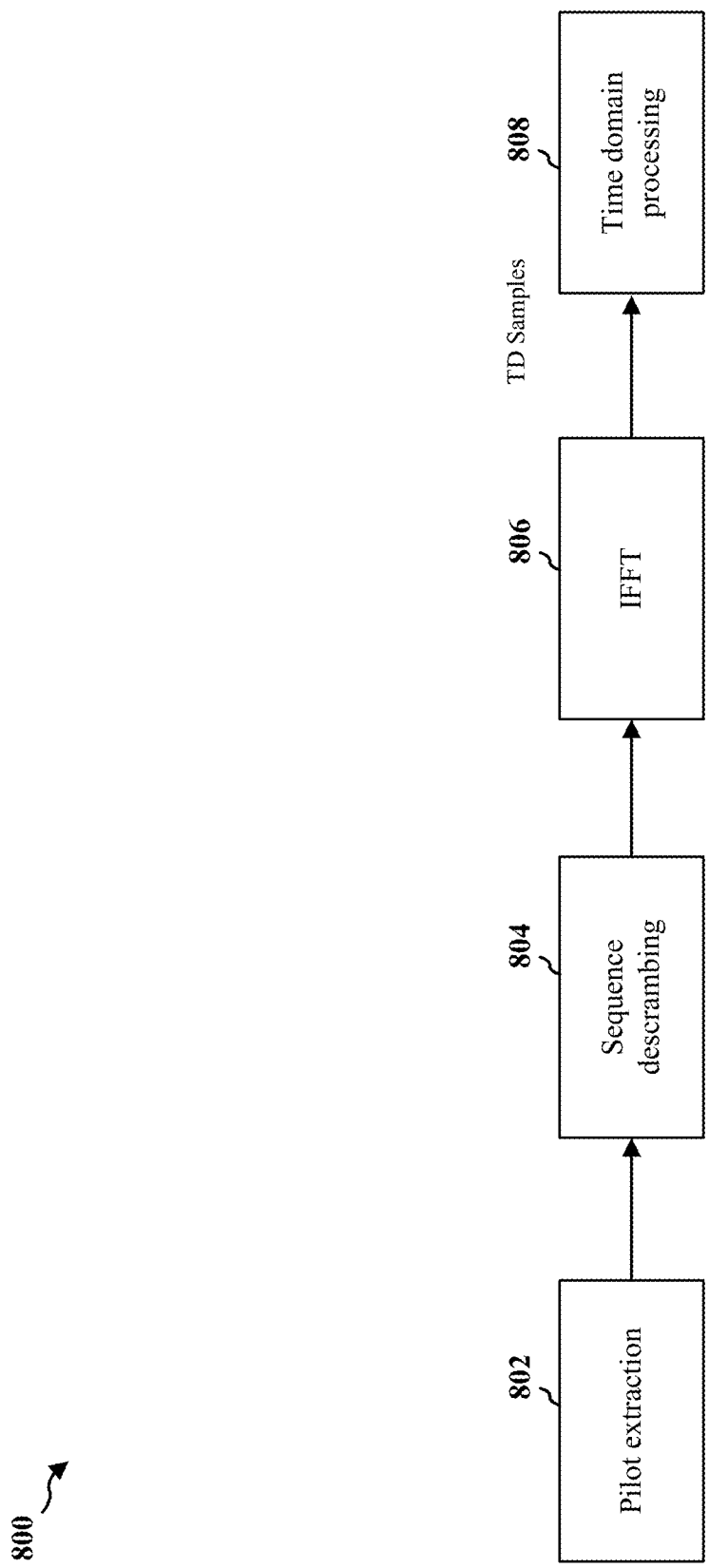
FIG. 8 is a diagram illustrating example processing chain at a practical receiver, in accordance with various aspects of the present disclosure.

FIG. 8 is a diagram 800 illustrating example processing chain at a practical receiver, in accordance with various aspects of the present disclosure. For a practical receiver, to process a received PSCCH transmission, the pilots (e.g., the DM RS pilots) may be extracted at pilot extraction 802. After extracting the pilots (e.g., the DM RS pilots), the receiver may perform sequence descrambling at 804. After performing the sequence descrambling at 804, the receiver may perform inverse fast Fourier transform (IFFT) at 806. After performing the IFFT at 806, the receiver may perform time domain (TD) processing at 808. For a practical receiver, in case multiple users with different TO are expected, processing is done in the time domain. The example processing chain may be demonstrating time domain processing.

Figure 9:
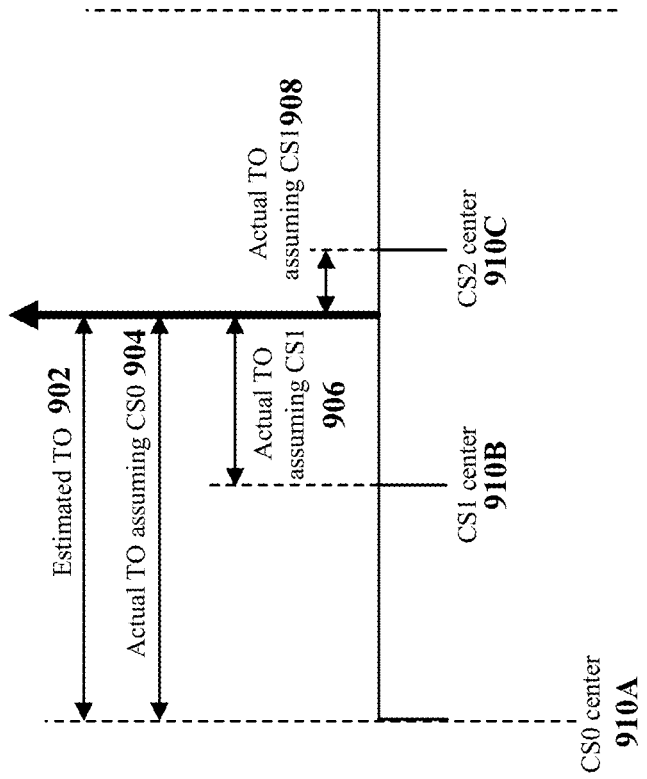
FIG. 9 is a diagram illustrating example timing ambiguity, in accordance with various aspects of the present disclosure.

FIG. 9 is a diagram 900 illustrating example timing ambiguity, in accordance with various aspects of the present disclosure. A modem at a receiver may be able to estimate the TO. However, such a modem may not be able to know what's the CS associated with a received transmission and may not know what's the actual TO. As illustrated in FIG. 9, the estimated TO 902 may be estimated based on CS0 center 910A. However, the actual TO associated with the communication may be estimated as any one of actual TO assuming CS0 904 based on CS0 center 910A, actual TO assuming CS1 906 based on CS1 center 910B, or actual TO assuming CS2 908 based on CS2 center 910C. As an example, 400 meters may be represented by a delay of 1.39 μs. Assuming T_offset=0 the receiver can detect negative and positive timing offsets symmetrically the physical TO that a CS may see may be TO=1.39 μs–CS_index×CS_interval, where CS interval may be equal to ⅓₀ KHz/¾=2.77 μs. Therefore, for CS0, TO may be 1.39 μs which corresponds to 400 meters. For CS1, TO may be −1.39 μs which corresponds to −400 meters. For CS2, TO may be −4.17 μs which corresponds to −1200 meters. Therefore, the receiver would not be able to correctly demodulate the control data without knowing the actual TO without CS. Aspects provided herein may provide the PSCCH such that reception of the PSCCH would not have an ambiguous TO while still using multiple CSs, causing the receiver to process the PSCCH more efficiently with potentially less latency. Based on aspects provided herein, there may be no ambiguous range due to CS, resulting in potentially less processing load and latency and less power consumption at a receiver. Based on aspects provided herein, the PSCCH waveform may be modulated in a way such that PSCCH payload (data) may also be modulated with a same CS as the pilots. By modulating the PSCCH waveform in a way such that PSCCH payload may also be modulated with a same CS as the pilots, there may be no need for specific CS removal from the channel estimation, as PSCCH data and pilots may experience the same total TO.

Figure 10:
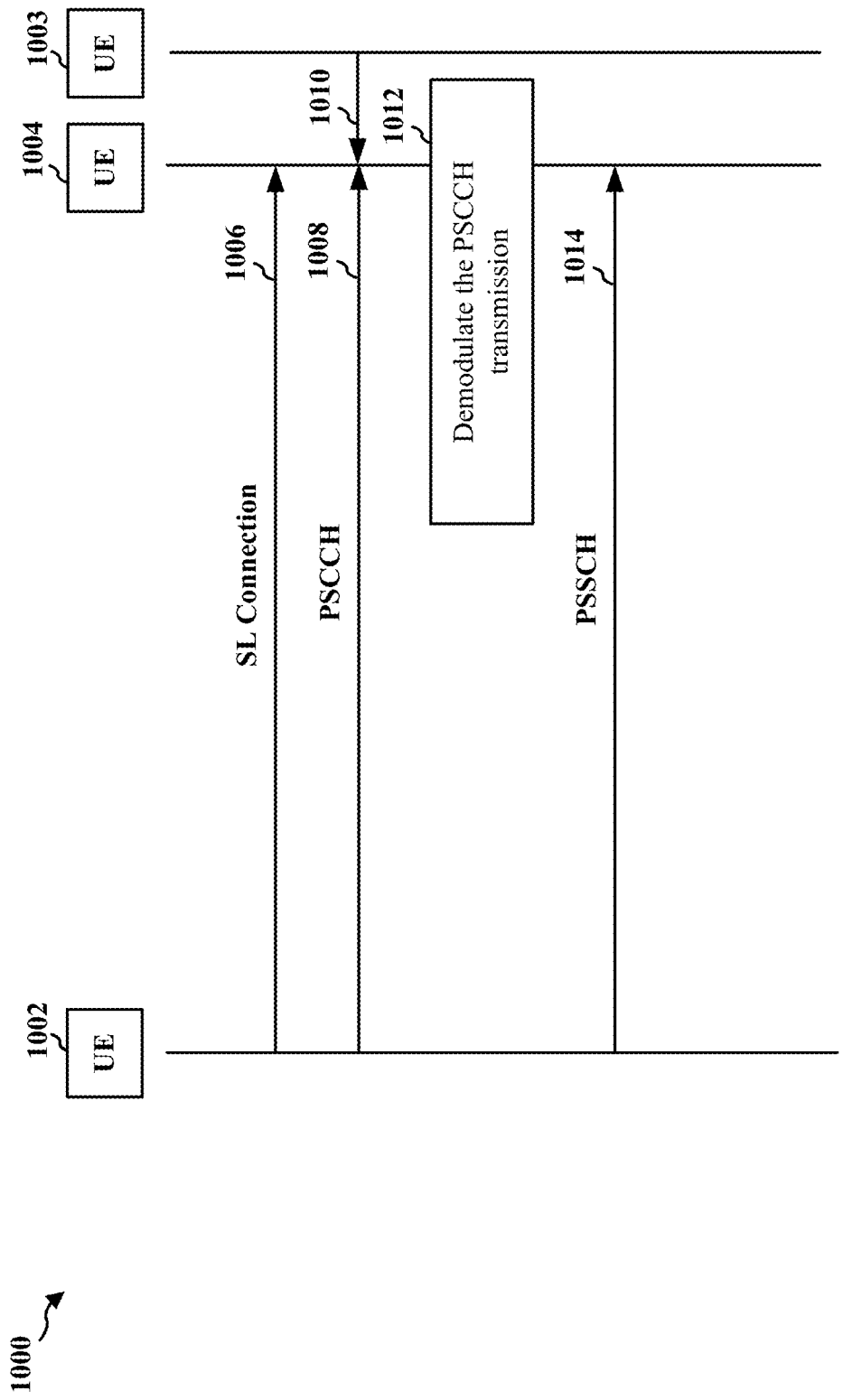
FIG. 10 is a diagram illustrating example communications between two UEs, in accordance with various aspects of the present disclosure.

FIG. 10 is a diagram 1000 illustrating example communications between two UEs, UE 1002 and UE 1004, in accordance with various aspects of the present disclosure. As illustrated in FIG. 10, the UE 1002 and the UE 1004 may establish a sidelink connection 1006. After establishing the sidelink connection 1006, the UE 1002 may transmit a PSCCH transmission 1008 to the UE 1004. In some aspects, the PSCCH transmission 1008 may be based on a waveform such that the PSCCH payload in the PSCCH transmission may be modulated with a same CS as the pilots (DM RS pilots) in the PSCCH transmission. By modulating the PSCCH waveform in a way such that PSCCH payload may also be modulated with a same CS as the pilots, there may be no need for specific CS removal from the channel estimation, as PSCCH data and pilots may experience the same total TO. Upon receiving the PSCCH transmission 1008, the UE 1004 may demodulate the PSCCH transmission at 1012. For example, the UE 1004 may demodulate the PSCCH transmission at 1012 in a receiver or modem associated with the UE 1004. In some aspects, the demodulation of the PSCCH transmission at 1012 may include estimating a TO regardless of if it's a physical TO without CS or a combination of physical TO and CS. Because the PSCCH payload and the DM RS pilots in the PSCCH transmission 1008 would be modulated based on a same CS, regardless of whether the TO is a physical TO without CS or a combination of physical TO and CS, the UE 1004 would still be able to demodulate the PSCCH payload in the PSCCH transmission 1008 based on the DM RS pilot in the PSCCH transmission 1008 since the PSCCH payload in the PSCCH transmission 1008 and the DM RS pilot in the PSCCH transmission 1008 would have a same TO, regardless of whether that TO is a combination of physical TO and CS or not.

In some aspects, the UE 1004 may be capable of demodulating multiple signals without multiple CSs. For example, the UE 1004 may receive and demodulate another PSCCH transmission 1010 from another UE 1003. In some aspects, to demodulate the PSCCH transmission 1008 at 1012, the PSCCH transmission 1010 from the UE 1003 would be viewed as an interference for the PSCCH transmission 1008. In some aspects, to demodulate the PSCCH transmission 1010, the PSCCH transmission 1008 from the UE 1004 would be viewed as an interference for the PSCCH transmission 1012.

In some aspects, the UE 1004 may still demodulate the PSCCH transmission 1008 at 1012 based on knowledge of the physical TO associated with the PSCCH transmission 1008 or use knowledge of the physical TO for a secondary input to time tracking loop. For example, in some aspects, the UE 1002 may attach signaling (e.g., information) associated with the CS of the PSCCH transmission 1008 to the PSCCH transmission 1008. In some aspects, the UE 1002 may attach signaling (e.g., information) associated with the CS of the PSCCH transmission 1008 to the PSCCH transmission 1008 by XOR the actual CS of the PSCCH transmission 1008 with a generated TB CRC of the PSCCH transmission 1008. The UE 1004 may XOR a number (e.g., three) of different CS with the generated TB CRC, and a CS that corresponds to the CS used to generate (e.g., yield) a valid result. With the knowledge of the actual CS, the UE 1004 may be able to subtract the actual CS from the measured TO and accordingly estimate the physical TO.

In some aspects, after transmitting the PSCCH transmission 1008, the UE 1002 may transmit an associated PSSCH transmission 1014 to the UE 1004. In some aspects, the PSCCH payload associated with the PSCCH transmission 1008 may be used (e.g., by the UE 1004) for decoding the associated PSSCH transmission 1014.

Figure 11:
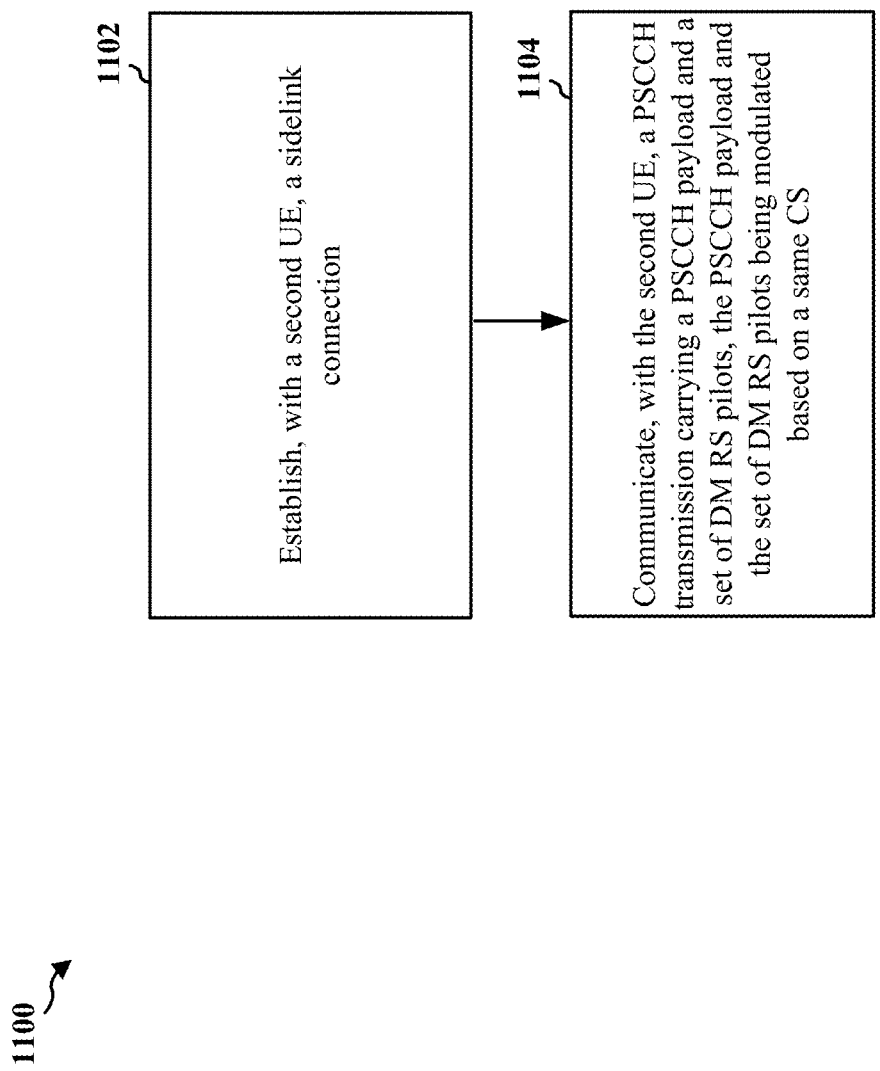
FIG. 11 is a flowchart of a method of wireless communication, in accordance with various aspects of the present disclosure.

FIG. 11 is a flowchart 1100 of a method of wireless communication. The method may be performed by a UE (e.g., the UE 104; the apparatus 1204). The method may help to reduce a processing load, latency, and/or power consumption at a receiving device by avoiding CS hypotheses in channel estimation and demodulation of a PSSCH transmitted by the UE.

At 1102, the UE may establish, with a second UE, a sidelink connection. For example, the UE 1002 or the UE 1004 may establish, with a second UE (the UE 1004 or the UE 1002), a sidelink connection at 1006. In some aspects, 1102 may be performed by PSCCH component 198.

At 1104, the UE may communicate, with the second UE, a PSCCH transmission carrying a PSCCH payload and a set of DM RS pilots, the PSCCH payload and the set of DM RS pilots being modulated based on a same CS. For example, the UE 1002 or the UE 1004 may communicate, with the second UE (the UE 1004 or the UE 1002), a PSCCH transmission 1008 carrying a PSCCH payload and a set of DM RS pilots, the PSCCH payload and the set of DM RS pilots being modulated based on a same CS. In some aspects, 1104 may be performed by PSCCH component 198. In some aspects, to communicate the PSCCH transmission, the UE (e.g., the UE 1002) may transmit, to the second UE (e.g., the UE 1004), the PSCCH transmission (e.g., 1008) carrying the PSCCH payload and the set of DM RS pilots. In some aspects, to communicate the PSCCH transmission, the UE (e.g., the UE 1004) receive, from the second UE (e.g., the UE 1002), the PSCCH transmission (e.g., 1008) carrying the PSCCH payload and the set of DM RS pilots.

In some aspects, the UE (e.g., the UE 1004) may demodulate the PSCCH transmission (e.g., 1012) based on estimating a TO associated with the PSCCH transmission, where the estimated TO is a sum of a physical TO and a timing shift caused by the CS. In some aspects, the UE (e.g., the UE 1004) may receive, from a third UE (e.g., 1003), a second PSCCH transmission (e.g., 1010) carrying a second PSCCH payload and a second set of DM RS pilots, the second PSCCH payload and the second set of DM RS pilots being modulated based on a second CS. In some aspects, the UE (e.g., the UE 1004) may demodulate the PSCCH transmission and consider the second PSCCH transmission from the third UE as an interference of the PSCCH transmission.

In some aspects, a signaling of the same CS may be attached to the data (e.g., by the UE 1002). In some aspects, an indication associated with the same CS is attached to the PSCCH payload. In some aspects, the same CS modulates a cyclic redundancy checksum (CRC) associated with a TB associated with the PSCCH transmission. For example, the same CS may be XOR'ed with the generated CRC. In some aspects, to communicate the PSCCH transmission, the UE may receive, from the second UE, the PSCCH transmission carrying the PSCCH payload and the set of DM RS pilots, and the UE may compare multiple hypothesis CS with the CRC and determine a valid CS hypothesis from the multiple hypothesis CS based on a comparison with the CRC. In some aspects, the UE may subtract the valid CS hypothesis from an estimated TO associated with the PSCCH transmission to determine a physical TO associated with the PSCCH transmission.

Figure 12:
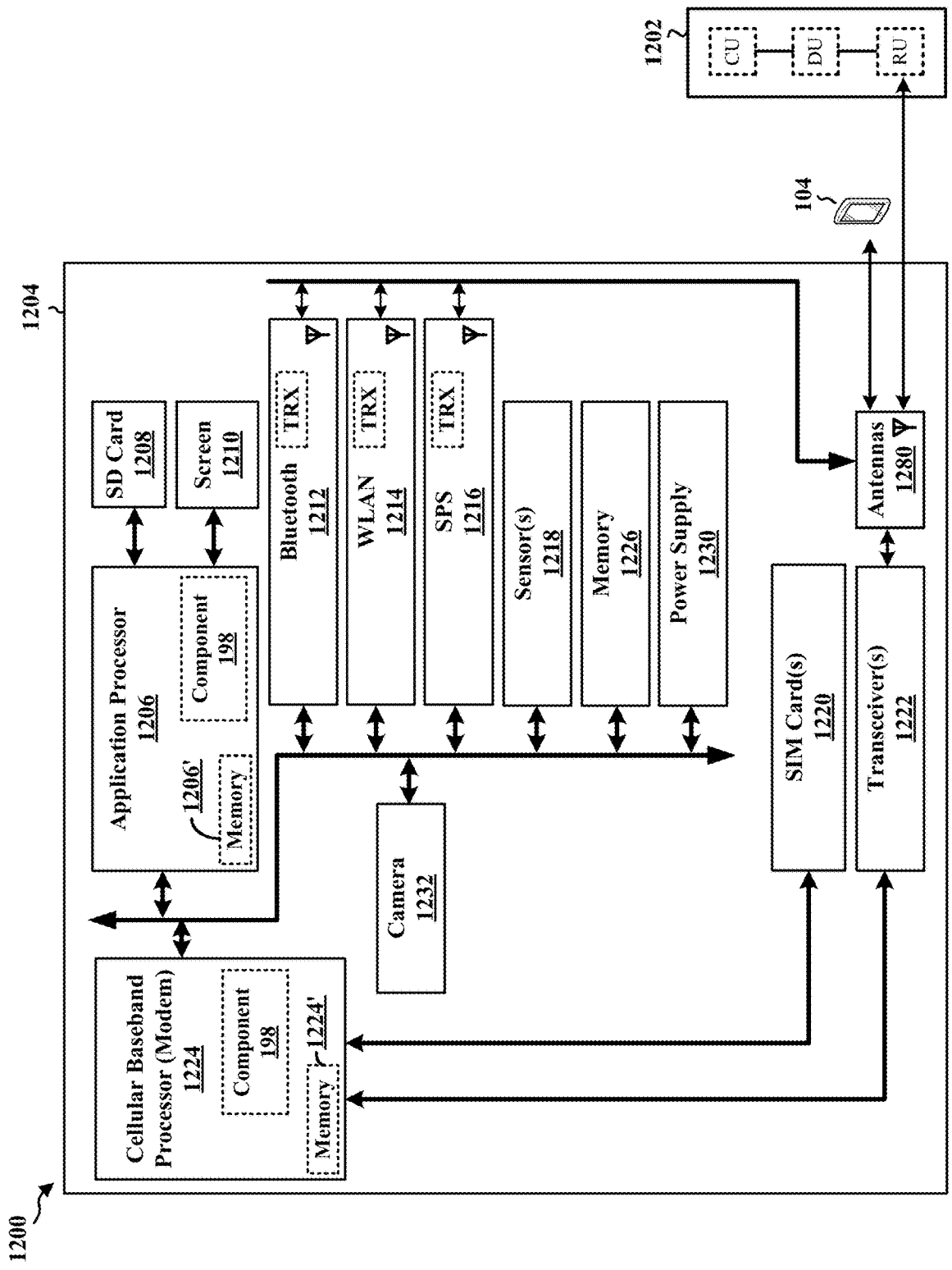
FIG. 12 is a diagram illustrating an example of a hardware implementation for an example apparatus and/or network entity, in accordance with various aspects of the present disclosure.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, a satellite system module 1216 (e.g., GNSS module), one or more sensor modules 1218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the satellite system module 1216 may include an on-chip transceiver (TRX)/receiver (RX). The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described herein. The computer-readable medium/memory may also be used for storing data that is manipulated by the cellular baseband processor 1224/application processor 1206 when executing software. The cellular baseband processor 1224/application processor 1206 may be a component of the wireless device 350 and may include the at least one memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed herein, the PSCCH component 198 may be configured to establish, with a second UE, a sidelink connection. In some aspects, the PSCCH component 198 may be further configured to communicate, with the second UE, a PSCCH transmission carrying a PSCCH payload and a set of DM RS pilots, the PSCCH payload and the set of DM RS pilots being modulated based on a same CS. The PSCCH component 198 may be within the cellular baseband processor 1224, the application processor 1206, or both the cellular baseband processor 1224 and the application processor 1206. The PSCCH component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for establishing, with a second UE, a sidelink connection. In some aspects, the apparatus 1204 may further include means for communicating, with the second UE, a PSCCH transmission carrying a PSCCH payload and a set of DM RS pilots, the PSCCH payload and the set of DM RS pilots being modulated based on a same CS. In some aspects, the apparatus 1204 may further include means for transmitting, to the second UE, the PSCCH transmission carrying the PSCCH payload and the set of DM RS pilots. In some aspects, the apparatus 1204 may further include means for receiving, from the second UE, the PSCCH transmission carrying the PSCCH payload and the set of DM RS pilots. In some aspects, the apparatus 1204 may further include means for demodulating the PSCCH transmission based on estimating a TO associated with the PSCCH transmission, where the estimated TO is a sum of a physical TO and a timing shift caused by the CS. In some aspects, the apparatus 1204 may further include means for receiving, from a third UE, a second PSCCH transmission carrying a second PSCCH payload and a second set of DM RS pilots, the second PSCCH payload and the second set of DM RS pilots being modulated based on a second CS. In some aspects, the apparatus 1204 may further include means for demodulating the PSCCH transmission and consider the second PSCCH transmission from the third UE as an interference of the PSCCH transmission. In some aspects, the apparatus 1204 may further include means for receiving, from the second UE, the PSCCH transmission carrying the PSCCH payload and the set of DM RS pilots. In some aspects, the apparatus 1204 may further include means for comparing multiple hypothesis CS with the CRC. In some aspects, the apparatus 1204 may further include means for determining a valid CS hypothesis from the multiple hypothesis CS based on a comparison with the CRC. In some aspects, the apparatus 1204 may further include means for subtracting the valid CS hypothesis from an estimated TO associated with the PSCCH transmission to determine a physical TO associated with the PSCCH transmission. The means may be the PSCCH component 198 of the apparatus 1204 configured to perform the functions recited by the means. As described herein, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in at least one memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method for wireless communication performed by a user equipment (UE), including: establishing, with a second UE, a sidelink connection; and communicating, with the second UE, a PSCCH transmission carrying a PSCCH payload and a set of DM RS pilots, the PSCCH payload and the set of DM RS pilots being modulated based on a same CS.

Aspect 2 is the method of aspect 1, where communicating the PSCCH transmission includes: transmitting, to the second UE, the PSCCH transmission carrying the PSCCH payload and the set of DM RS pilots.

Aspect 3 is the method of aspect 1, where communicating the PSCCH transmission includes: receiving, from the second UE, the PSCCH transmission carrying the PSCCH payload and the set of DM RS pilots.

Aspect 4 is the method of aspect 3, further including: demodulating the PSCCH transmission based on estimating a timing offset (TO) associated with the PSCCH transmission, where the estimated TO is a sum of a physical TO and a timing shift caused by the CS.

Aspect 5 is the method of aspect 4, further including: receiving, from a third UE, a second PSCCH transmission carrying a second PSCCH payload and a second set of DM RS pilots, the second PSCCH payload and the second set of DM RS pilots being modulated based on a second CS.

Aspect 6 is the method of aspect 5, further including: demodulating the PSCCH transmission and consider the second PSCCH transmission from the third UE as an interference of the PSCCH transmission.

Aspect 7 is the method of any of aspects 1-6, where an indication associated with the same CS is attached to the PSCCH payload.

Aspect 8 is the method of any of aspects 1-7, where the same CS modulates a cyclic redundancy checksum (CRC) associated with a transport block (TB) associated with the PSCCH transmission.

Aspect 9 is the method of aspect 8, where communicating the PSCCH transmission includes receiving, from the second UE, the PSCCH transmission carrying the PSCCH payload and the set of DM RS pilots, and further including: comparing multiple hypothesis CS with the CRC; and determining a valid CS hypothesis from the multiple hypothesis CS based on a comparison with the CRC.

Aspect 10 is the method of aspect 9, further including: subtracting the valid CS hypothesis from an estimated timing offset (TO) associated with the PSCCH transmission to determine a physical TO associated with the PSCCH transmission.

Aspect 11 is an apparatus for wireless communication at a device including at least one memory and at least one processor coupled to the at least one memory and, based at least in part on information stored in the at least one memory, the at least one processor, individually or in combination, is configured to implement any of aspects 1 to 10.

Aspect 12 is an apparatus for wireless communication at a device including at least one memory and at least one processor coupled to the at least one memory and configured, individually or in combination, to implement any of aspects 1 to 10.

Aspect 13 is the apparatus of aspect 1 or aspect 12, further including a transceiver or an antenna coupled to the at least one processor.

Aspect 14 is an apparatus for wireless communication at a device including at least one or more memories and one or more processors coupled to the one or more memories and, based at least in part on information stored in the one or more memories, the one or more processors, individually or in combination, are configured to implement any of aspects 1 to 10.

Aspect 15 is an apparatus for wireless communication at a device including means for implementing any of aspects 1 to 10.

Aspect 16 is a computer-readable medium (e.g., a non-transitory computer-readable medium) storing computer executable code, where the code when executed by at least one processors causes the at least one processor to implement any of aspects 1 to 10.

What is claimed is:

1. An apparatus for wireless communication at a user equipment (UE), comprising:
    at least one memory; and
    at least one processor coupled to the at least one memory and, based at least in part on stored information that is stored in the at least one memory, the at least one processor is configured to cause the apparatus to:
        establish, with a second UE, a sidelink connection; and
        communicate, with the second UE, a physical sidelink control channel (PSCCH) transmission carrying a PSCCH payload and a set of demodulation reference signal (DM RS) pilots, the PSCCH payload and the set of DM RS pilots being modulated based on a same cyclic shift (CS).

2. The apparatus of claim 1, further comprising:
    at least one transceiver coupled to the at least one processor, wherein to communicate the PSCCH transmission, the at least one processor is further configured to cause the apparatus to:
        transmit, to the second UE via the transceiver, the PSCCH transmission carrying the PSCCH payload and the set of DM RS pilots.

3. The apparatus of claim 1, wherein to communicate the PSCCH transmission, the at least one processor is further configured to cause the apparatus to:
    receive, from the second UE, the PSCCH transmission carrying the PSCCH payload and the set of DM RS pilots.

4. The apparatus of claim 3, wherein the at least one processor is further configured to cause the apparatus to:
    demodulate the PSCCH transmission based on:
        a timing offset (TO) estimation associated with the PSCCH transmission, wherein the estimated TO is a sum of a physical TO and a timing shift caused by the CS.

5. The apparatus of claim 4, wherein the at least one processor is further configured to cause the apparatus to:
    receive, from a third UE, a second PSCCH transmission carrying a second PSCCH payload and a second set of DM RS pilots, the second PSCCH payload and the second set of DM RS pilots being modulated based on a second CS.

6. The apparatus of claim 5, wherein the at least one processor is further configured to cause the apparatus to:
    demodulate the PSCCH transmission and consider the second PSCCH transmission from the third UE as an interference of the PSCCH transmission.

7. The apparatus of claim 1, wherein an indication associated with the same CS is attached to the PSCCH payload.

8. The apparatus of claim 1, wherein the same CS modulates a cyclic redundancy checksum (CRC) associated with a transport block (TB) associated with the PSCCH transmission.

9. The apparatus of claim 8, wherein to communicate the PSCCH transmission, the at least one processor is further configured to cause the apparatus to receive, from the second UE, the PSCCH transmission carrying the PSCCH payload and the set of DM RS pilots, and wherein the at least one processor is further configured to cause the apparatus to:
    compare multiple hypothesis CS with the CRC; and
    determine a valid CS hypothesis from the multiple hypothesis CS based on a comparison with the CRC.

10. The apparatus of claim 9, wherein the at least one processor is further configured to cause the apparatus to:
    subtract the valid CS hypothesis from an estimated timing offset (TO) associated with the PSCCH transmission to determine a physical TO associated with the PSCCH transmission.

11. A method for wireless communication performed by a user equipment (UE), comprising:
    establishing, with a second UE, a sidelink connection; and
    communicating, with the second UE, a physical sidelink control channel (PSCCH) transmission carrying a PSCCH payload and a set of demodulation reference signal (DM RS) pilots, the PSCCH payload and the set of DM RS pilots being modulated based on a same cyclic shift (CS).

12. The method of claim 11, wherein communicating the PSCCH transmission comprises:
    transmitting, to the second UE, the PSCCH transmission carrying the PSCCH payload and the set of DM RS pilots.

13. The method of claim 11, wherein communicating the PSCCH transmission comprises:

receiving, from the second UE, the PSCCH transmission carrying the PSCCH payload and the set of DM RS pilots.

14. The method of claim 13, further comprising:
demodulating the PSCCH transmission based on:
estimating a timing offset (TO) associated with the PSCCH transmission, wherein the estimated TO is a sum of a physical TO and a timing shift caused by the CS.

15. The method of claim 14, further comprising:
receiving, from a third UE, a second PSCCH transmission carrying a second PSCCH payload and a second set of DM RS pilots, the second PSCCH payload and the second set of DM RS pilots being modulated based on a second CS.

16. The method of claim 15, further comprising:
demodulating the PSCCH transmission and consider the second PSCCH transmission from the third UE as an interference of the PSCCH transmission.

17. The method of claim 11, wherein an indication associated with the same CS is attached to the PSCCH payload.

18. The method of claim 11, wherein the same CS modulates a cyclic redundancy checksum (CRC) associated with a transport block (TB) associated with the PSCCH transmission.

19. The method of claim 18, wherein communicating the PSCCH transmission comprises receiving, from the second UE, the PSCCH transmission carrying the PSCCH payload and the set of DM RS pilots, and further comprising:
comparing multiple hypothesis CS with the CRC; and
determining a valid CS hypothesis from the multiple hypothesis CS based on a comparison with the CRC.

20. The method of claim 19, further comprising:
subtracting the valid CS hypothesis from an estimated timing offset (TO) associated with the PSCCH transmission to determine a physical TO associated with the PSCCH transmission.

21. An apparatus for wireless communication at a user equipment (UE), comprising:
means for establishing, with a second UE, a sidelink connection; and
means for communicating, with the second UE, a physical sidelink control channel (PSCCH) transmission carrying a PSCCH payload and a set of demodulation reference signal (DM RS) pilots, the PSCCH payload and the set of DM RS pilots being modulated based on a same cyclic shift (CS).

22. A non-transitory computer-readable medium storing computer executable code at a user equipment (UE), the code when executed by a processor causes the processor to:
establish, with a second UE, a sidelink connection; and
communicate, with the second UE, a physical sidelink control channel (PSCCH) transmission carrying a PSCCH payload and a set of demodulation reference signal (DM RS) pilots, the PSCCH payload and the set of DM RS pilots being modulated based on a same cyclic shift (CS).

* * * * *